(12) United States Patent
Patel et al.

(10) Patent No.: US 10,382,687 B1
(45) Date of Patent: Aug. 13, 2019

(54) NESTED DISTURBANCE REJECTION CONTROLLER INTEGRATED WITHIN CAMERA MODULE

(71) Applicant: Apple Inc., Cupertino, CA (US)

(72) Inventors: Parin Patel, San Francisco, CA (US); Santiago Alban, Mountain View, CA (US); Andrew Kenneth John McMahon, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/679,110

(22) Filed: Aug. 16, 2017

Related U.S. Application Data

(60) Provisional application No. 62/376,341, filed on Aug. 17, 2016.

(51) Int. Cl.
| | | |
|---|---|---|
| *H04N 5/228* | (2006.01) | |
| *H04N 5/232* | (2006.01) | |
| *G03B 13/00* | (2006.01) | |
| *G02B 27/64* | (2006.01) | |

(52) U.S. Cl.
CPC ....... *H04N 5/23287* (2013.01); *G02B 27/646* (2013.01); *H04N 5/23258* (2013.01); *H04N 5/23264* (2013.01)

(58) Field of Classification Search
CPC ........... H04N 2/23251; H04N 5/23254; H04N 5/23258; H04N 5/23264; H04N 5/2328; H04N 5/23287; G02B 27/64; G02B 27/646

See application file for complete search history.

(56) References Cited

U.S. PATENT DOCUMENTS

| | | | |
|---|---|---|---|
| 7,791,644 B2 | 9/2010 | Ebato | |
| 9,077,902 B2 | 7/2015 | Hoshino | |
| 9,503,647 B2* | 11/2016 | Shibata | ................ G02B 27/646 |
| 2013/0247663 A1* | 9/2013 | Patel | ................... G01C 19/5776 |
| | | | 73/504.12 |
| 2015/0103194 A1 | 4/2015 | Takeuchi | |
| 2015/0198818 A1 | 7/2015 | Miyasako | |
| 2017/0208250 A1* | 7/2017 | Uemura | ............. H04N 5/23245 |

\* cited by examiner

*Primary Examiner* — Ngoc Yen T Vu
(74) *Attorney, Agent, or Firm* — Robert C. Kowert; Meyertons, Hood, Kivlin, Kowert & Goetzel, P.C.

(57) ABSTRACT

At a processor of a camera-equipped electronic device, a first data set generated at a sensor incorporated within a camera module is obtained, and a second data set generated at one or more sensors external to the camera module is obtained. Based on the first set and second data sets, a first set of control signals is transmitted to the camera module. At a disturbance rejection controller integrated within the camera module, a second set of control signals is generated, based on the first set of control signals and on a third set of data obtained from the sensor incorporated within the camera module. The second set of control signals is transmitted to an actuator, which causes a displacement of a camera lens.

20 Claims, 9 Drawing Sheets

NESTED DISTURBANCE REJECTION CONTROLLER INTEGRATED WITHIN CAMERA MODULE

This application claims benefit of priority to U.S. Provisional Application No. 62/376,341, filed Aug. 17, 2016, titled "Nested Disturbance Rejection Controller Integrated Within Camera Module", which is hereby incorporated by reference in its entirety.

BACKGROUND

Technical Field

This disclosure relates generally to control of the motion of camera components of electronic devices, and more specifically to lens motion control for small form factor cameras.

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of an image sensor (which may also be referred to as a photosensor) with small pixel size and a good, compact imaging lens system. Advances in technology have achieved reduction of the pixel size in image sensors. However, as image sensors become more compact and powerful, demand for compact imaging lens system with improved imaging quality performance has increased.

Some small form factor cameras may incorporate an autofocus (AF) mechanism whereby the object focal distance can be adjusted to focus an object plane or field in front of the camera at an image plane to be captured by an image sensor. In some such autofocus mechanisms, the optical lens is moved as a single rigid body along the optical axis (referred to as the Z axis) of the camera to refocus the camera. In addition, high image quality is easier to achieve in small form factor cameras if lens motion along the optical axis is accompanied by minimal parasitic translation or rotation in the other degrees of freedom, for example on the X and Y axes orthogonal to the optical (Z) axis of the camera. Thus, some small form factor cameras that include autofocus mechanisms may also incorporate optical image stabilization (OIS) mechanisms that may sense and react to some types of external disturbances by adjusting the location of the optical lens on the X and/or Y axis in an attempt to compensate for unwanted motion of the lens. However, depending on the environment in which the small form factor camera is used (e.g., whether it is being used within a moving vehicle subject to vibrations) and/or the extent to which the camera lens is mechanically damped, traditional feedback-based techniques for lens movement control may sometimes be insufficient to enable images or videos of desired quality levels to be generated.

SUMMARY OF EMBODIMENTS

Embodiments of systems and methods using nested control mechanisms integrated within camera modules of electronic devices to respond to mechanical disturbances of different frequencies are described. According to one embodiment, an electronic device may comprise one or more processors (used for processing associated with an outer loop of a nested control mechanism for lens positioning) and a camera module. The camera module (which may comprise various optics, magnetic, mechanical, and/or as electronic circuitry elements) may be encased within its own packaging, and an interconnect such as an I2C (inter-integrated circuit) bus may be usable in at least some embodiments to connect the camera module to, for example, a primary printed circuit board or motherboard containing the processors. The camera module may include circuitry used for at least a portion of the inner loop of the nested control mechanism, a lens position sensor, and an actuator. The one or more processors may obtain respective input data sets from one or more device-level motion sensors (e.g., gyroscopes, accelerometers and the like) and the lens position sensor, e.g., a first sampling frequency, and generate a first set of control signals. The first set of control signals may be transmitted to the camera module via the interconnect, and lens position data may be obtained at the one or more processors via the interconnect. Based on the first set of control signals, and on additional input data obtained locally (i.e., within the camera module itself) from the lens position sensor at a second sampling frequency (which may be higher than the first sampling frequency), a second set of control signals may be generated at the inner loop. The second set of control signals may be transmitted to the actuator at a rate corresponding to the second sampling frequency, and the actuator may cause a camera lens to move. In embodiments in which the second sampling frequency is higher than the first, the inner loop may be referred to as a high frequency disturbance rejection (HFDR) controller, as it may enable compensatory actions (or "rejections") for higher-frequency disturbances (such as some disturbances which may be caused by vehicle vibrations, by a user tapping the device, or by haptic actuators or other haptic feedback) than the disturbances which can be handled effectively by the outer loop alone. Because the high frequency disturbances may be detected locally at the camera module, and because the processing for the responsive actions to the high frequency disturbances may be performed using circuitry integrated within the camera module, overhead associated with high frequency disturbances may be minimized or eliminated at the primary processors (e.g., CPUs) of the device and/or at the interconnect linking the primary processors to the camera module. As such, the nested HFDR controller mechanism integrated within the camera module may enable offloading of at least some lens position-related processing from the primary processors, and may also enable higher quality images and videos to be produced than if such an integrated mechanism were not employed.

In various embodiments, the actuator may cause the lenses to move along any combination of axes, e.g., to provide autofocus functionality by adjusting the distance between the lens and a photosensor of the camera, or to provide optical image stabilization (OIS) functionality to improve image quality. In one embodiment, lens rotation actuation may be enabled by rotation sensors and actuators as well. In some embodiments, the actuator may comprise a voice coil motor (VCM) driver. In at least one embodiment, a lens position sensor may comprise a Hall effect sensor (also known as a Hall sensor). The inner loop of the control mechanism may be implemented on the same chip or ASIC (application-specific integrated circuit) as the actuator's circuitry and/or the circuitry associated with the lens position sensor in some embodiments. As a result, lens position data may be received at the inner loop much more quickly than if the data were to cross ASIC boundaries in such embodiments, or if the data had to be transmitted using an I2C bus or similar interconnect. Similarly, the control signals of the inner loop may be received at the actuator more quickly than if ASIC boundaries had to be crossed or if a bus had to be used. In other embodiments, different integrated circuits may be used for the HFDR controller, the actuator, and/or the lens position sensor. In some embodiments, data indicative of the lens position may be stored at one or more registers at the camera module, and read from the registers by the processors via the interconnect.

Any of a variety of controller architectures or algorithms may be employed at either the inner loop or the outer loop of the nested control mechanism in various embodiments, such as variants of the PID (proportional-integral-derivative) controller algorithm, the LQI (linear-quadratic-integral) controller algorithm, and so on. Algorithm parameters (such as the respective coefficients for the proportional, integral, and derivative terms in the PID example) which may be used to generate the control signals may be specified for the HFDR controller dynamically in some embodiments (e.g., as a result of the execution of parameter selection programs at the processors). In other embodiments, the parameter values to be used by the HFDR controller may be "burned" into a non-volatile or read-only memory at the camera module during manufacture. Other calibration parameters may also be passed in dynamically to the camera module in some embodiments. Any appropriate number of digital filters may be employed in various embodiments to affect the frequency response of the system.

According to one embodiment, a camera module of an electronic device may comprise one or more actuators, one or more lens position sensors, and one or more disturbance rejection controllers. A particular disturbance rejection controller may obtain a first set of control signals generated at one or more processors external to the camera module, and a first data set indicative of a position of a lens from a lens position sensor. The particular disturbance rejection controller may generate a second set of control signals based on the first set of control signals and the first data set, and transmit the second set of control signals to an actuator. The actuator may respond to the second set of control signals by causing a displacement of the lens. The first set of control signals may be transmitted at a first frequency or rate, while the second set of control signals may be transmitted at a different frequency or rate in at least some embodiments.

According to some embodiments, a method may comprise obtaining, at one or more processors of an electronic device, a first set of data generated by a particular sensor included within a camera module of the electronic device, and a second set of data generated by one or more sensors external to the camera module. The method may comprise transmitting, from the one or more processors to the camera module, a first set of control signals, wherein the first set of control signals is based at least in part on the first and/or the second set of data. The method may further comprise transmitting, from a particular disturbance rejection controller of the camera module to a particular actuator of the camera module, a second set of control signals. The second set of control signals may be based at least in part on a third set of data obtained from the particular sensor included within the camera module, and on the first set of control signals. The particular actuator may cause a camera lens to move in response to the second set of control signals.

Figure 1:
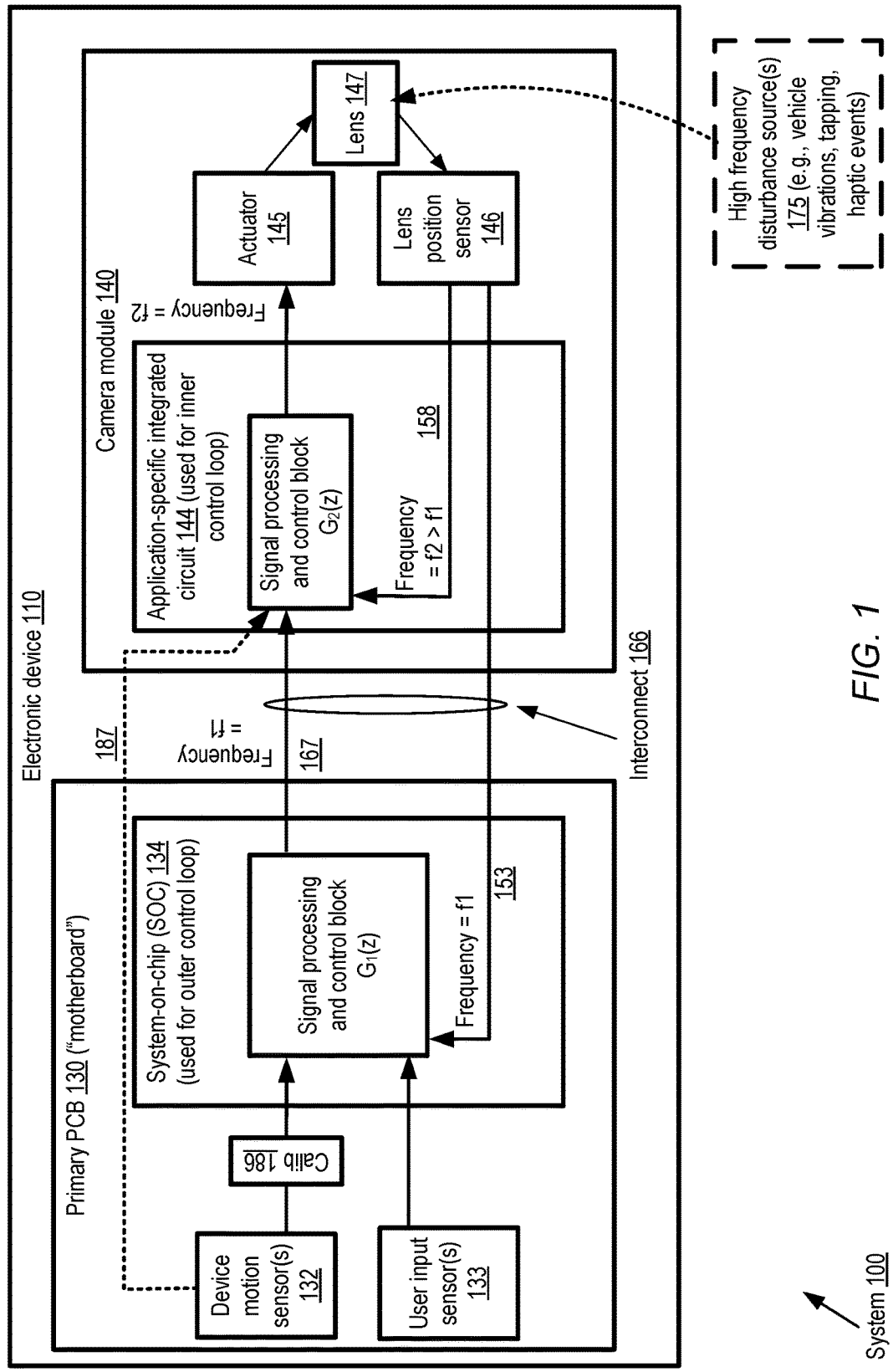
FIG. 1 provides an example architecture of nested controllers which may be employed in some camera-equipped electronic devices, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value. When used in the claims, the term "or" is used as an inclusive or and not as an exclusive or. For example, the phrase "at least one of x, y, or z" means any one of x, y, and z, as well as any combination thereof.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments of systems and methods for utilizing nested control circuitry integrated within camera modules of electronic devices to respond to various types of mechanical disturbances are described. Individual loops of the nested control circuitry may also be referred to herein as respective controllers. In some embodiments, for example, a pair of control loops may be implemented, with the outer loop designed at least in part to generate control signals to respond to disturbances indicated by data captured at a first sampling frequency or frequency range and to respond to user input, and the inner loop designed at least in part to generate control signals to handle disturbances indicated by data captured at a higher sampling frequency or frequency range than the outer loop. In such an embodiment, the inner loop may be referred to as a high frequency disturbance rejection (HFDR) controller. In at least some embodiments, the computations associated with the outer loop may be performed using a different set of resources than the computations associated with the inner loop. For example, in one embodiment, one or more primary processors or CPUs of the electronic device, which may be attached to the main printed circuit board or "motherboard" of the electronic device, may be used for the outer loop, while circuitry located within a camera module of the electronic device may be used for the inner loop. A camera module may be enclosed within its own packaging, and may for example comprise various optics, magnetic, mechanical and/or electronic circuitry components. A variety of sensors may generate input data used for one or both of the loops in various embodiments, indicative for example of movements of the camera lens itself, the electronic device as a whole, or of user-provided touch input. Generally speaking, the disturbance control techniques described herein may be employed for various types of small form factor cameras (including still and/or video cameras) incorporated within electronic devices such as cell phones, smartphones, pad or tablet computing devices, laptop, netbook, notebook, subnotebook, ultrabook computers, and so on.

FIG. 1 provides an example architecture of nested controllers which may be employed in some camera-equipped electronic devices, according to at least some embodiments. In system 100 of the depicted embodiment, a camera-equipped electronic device 110 comprises at least a primary printed circuit board 130 (the "motherboard" of the electronic device) and a camera module 140 linked to the primary printed circuit board via an interconnect 166 (such as an I2C bus, for example). The motherboard may include a system-on-chip (SOC) 134 which implements at least a portion of an outer control loop (or outer controller) used for responding to mechanical disturbances which may be experienced at a camera lens 147, while the camera module may include an application-specific integrated circuit (ASIC) 144 which implements at least a portion of a corresponding inner control loop (the inner controller). The SOC may include, among other components, one or more processors which perform the computations associated with a control algorithm used at the outer controller in the depicted embodiment. In the depicted embodiment, the camera module 140 may be a separately packaged component encased in its own cover, implementing a standardized interface so that it can be "plugged in" to any of a variety of electronic devices. In other embodiments, customized rather than standardized interconnects may be used. The camera module may include a combination of several different types of components in various embodiments, including one or more optics elements such as lens 147, magnets and magnetic field sensors, motors (e.g., voice coil motors), mechanical damping materials, springs, as well as electronic circuitry. In at least some embodiments, the camera module may be designed and manufactured separately from other components of the electronic device. As discussed below, in at least one embodiment the particular control algorithm used for lens position adjustments, or the parameters used in the control algorithm, may differ for the inner controller (integrated within the camera module) from the algorithm or parameters used at the outer controller. In various embodiments, the integration of the inner controller within the camera module may enable offloading of certain types of lens positioning-related processing from the processors at the motherboard, and may also help reduce the amount of data that has to pass through the interconnect 166.

The control signals generated at either controller loop in the depicted embodiment may be intended for any combination of a variety of objectives—e.g., for autofocus (AF), for optical image stabilization (OIS), and so on. The rate at which the position of the lens of the camera is disturbed, and therefore the corresponding frequency or rate at which compensating displacements have to be applied to the lens, may vary substantially depending on the source of the disturbance. For example, some types of movements, such as movements of the electronic device as a whole, which may be detected using gyroscopes, accelerometers and other device-level motion sensors 132 and sampled at relatively low frequencies, may typically require compensatory control signals at corresponding low frequencies. Other disturbances may emanate from high-frequency disturbance sources 175 (e.g., vibrations of a vehicle to which the camera-equipped electronic device may be attached, or from within which the electronic device may be being used), and may therefore require compensatory control signals of correspondingly high frequencies. In the depicted embodiment, the inner controller may be designed to be able to compensate for (or "reject") high frequency disturbances (as well as low-frequency disturbances), while the outer controller may be used primarily to respond to lower-frequency disturbances and to provide the "set points" for lens position for autofocus or image stabilization. In some cases, impulse events (such as a tapping of the camera-containing device by a user's finger) or haptic events (e.g., resulting from an incoming call when a phone's ringer is set to vibrate mode) may cause high frequency disturbances, which may also be stabilized or rejected using the inner controller. With respect to the embodiment depicted in FIG. 1, the term frequency may refer to both (a) the rate at which the input data is collected from various types of sensors (the "sampling frequency" for the input data) and (b) the rate at which the generated control signals are transmitted (e.g., from the SOC 134 to the camera module, or from the ASIC 144 to the actuator 140). In at least some embodiments, the categories of disturbance sources may differ from one another not only in the speed with which compensatory actions may be required, but also in the proximity (with respect to the camera module) of the sensors which detect the disturbances. Thus, in the depicted embodiment, it may be the case that it is possible to detect high-frequency movements/disturbances of the lens 147 at lens position sensors 146 located within the camera module itself. However, data which represent device-level movements or user input may be generated closer to (or at) the motherboard 130. It is noted that the device motion sensors 132 may also be used for high frequency disturbance rejection in at least some embodiments; that is, their use may not be limited to low frequency operations.

At signal processing and control block $G_1(z)$ of the outer controller at motherboard 130 of FIG. 1, respective data sets may be obtained from one or more types of sensors—e.g., from one or more device motion sensors (such as gyroscopes or accelerometers) 132, from one or more user input sensors 133 (e.g., touch screens which may be used to indicate targeted objects on which the lens 147 should be autofocused), as well as from one or more lens position sensors 146. In some embodiments, a calibration component 186 may be interposed between the device motion sensors and signal processing and control block $G_1(z)$. In some implementations, Hall effect sensors (also known as Hall sensors) may be used as lens position sensors. In the depicted embodiment, at least some of the data sets may be obtained at $G_1(z)$ at a particular sampling frequency f1, as indicated by the label "frequency=f1" designated for the pathway 153 between the lens position sensor 146 and $G_1(z)$. In at least one embodiment, data indicative of the position of lens 147 may be stored in one or more registers or other memory locations within the camera module 140, and the contents of the registers or memory locations may be read by (or transmitted to) a processor of the motherboard at sampling frequency f1, e.g., via interconnect 166 linking the camera module to the motherboard. Any of a variety of interconnects may be used in various embodiments, including for example an I2C (Inter-integrated circuit) bus, other serial buses, or the like. It is noted that the rate at which sensor data is generated or updated at the various sensors may not necessarily correspond to sampling frequency f1 (or sampling frequency f2, which is discussed below). For example, it may be the case in one implementation that one of the sensors updates its output 2000 times per second (i.e., at a frequency of 2 kilohertz), while the output is read or sampled only 1000 times per second (i.e., at a sampling frequency of 1 kilohertz) at the outer control loop. Any of a variety of control logic or algorithms may be used at either of the control loops depicted in FIG. 1, including for example the PID (proportional-integral-derivative) controller algorithm, the LQI (linear-quadratic-integral) controller algorithm, and so on.

Based at least in part on the input data collected (e.g., from the lens position sensors 146, motion sensors 132 and/or user input sensors 133), and based at least in part on the coefficients or other parameters of the particular control algorithm being used at the outer loop, a first set of control signals may be generated and transmitted to the camera module along pathway 167 (which may include the interconnect linking the camera module and the motherboard). As shown by the frequency label associated with pathway 167, the first set of control signals may be transmitted at frequency f1 in the depicted embodiment. Thus, in the depicted embodiment, the interconnect 166 may be used for obtaining some of the input data for the outer loop (along pathway 153) and also for transmitting the first set of control signals (along pathway 167).

The control signals transmitted from the outer loop may be received at signal processing and control block $G_2(z)$ of the inner controller. In addition, another set of input data generated at the lens position sensor(s) 146 may be obtained, e.g., at a higher sampling frequency f2 than f1 (and without using the interconnect 166). In at least one embodiment, data from motion sensors 132 may also be collected at the inner controller, as indicated by dashed line 187 in FIG. 1. Depending on the implementation and the control algorithm used, signal processing and control blocks $G_1(z)$ and/or $G_2(z)$ may comprise elements implementing feedforward control, feedback control, estimators for blending signals from the different sources indicated, and so on in various embodiments. Such elements may include a summing junction in one or both of the blocks $G_1(z)$ or $G_2(z)$ in some implementations. In one embodiment, at least some of the logic of the control algorithm may be implementing using firmware or software. Based at least in part on the control signals received from the outer loop, the additional input data obtained from the lens position sensor(s) (and/or the device motion sensors), and on parameters or coefficients of the control logic being implemented in the inner controller, a second set of control signals may be generated at the inner controller and transmitted to one or more actuator modules 145 in the depicted embodiment. An actuator module 145 may comprise, for example, a combination of electrical circuitry, optics elements, magnetic and/or mechanical elements in various embodiments, as discussed below in further detail. Similarly, lens position sensor 146 may also have associated circuitry as well as other subcomponents such as a Hall effect sensor which is not explicitly shown in FIG. 1. Actuator modules may also be referred to simply as actuators herein. Based on the second set of control signals, an actuator may cause the lens 147 to move, with the amount and direction of displacement selected according to the second set of control signals. This second set of control signals may be transmitted to the actuator at the higher frequency f2 in the depicted embodiment, and thus may be used effectively to respond to high frequency disturbances. At the same time, because the input used to generate the second set of control signals includes the control signals generated at the outer loop, the second set of control signals may also compensate at least to some extent for low-frequency disturbances in the embodiment shown in FIG. 1 (and help to initiate adjustments to lens positions based on user input obtained for example from a touch screen used as a viewfinder, for autofocus, zoom, and the like).

A number of variations to the basic architecture illustrated in FIG. 1 may be implemented in different embodiments, as discussed below in further detail. For example, respective distinct controllers or loops may be used for autofocus and for optical image stabilization in some embodiments, at least a portion of the circuitry of the actuator(s) and/or the lens position sensor(s) may be incorporated within the same ASIC as the inner controller, and so on. Some electronic devices may comprise multiple cameras and/or multiple camera modules, with respective inner controllers for the different modules. In one embodiment, as mentioned above, one or more estimators may be used to combine input data from various sensor devices. In some embodiments, one or more device motion sensors may be incorporated within a camera module such as module 140, e.g., in addition to or instead of device motion sensors external to the camera module.

Figure 2A:
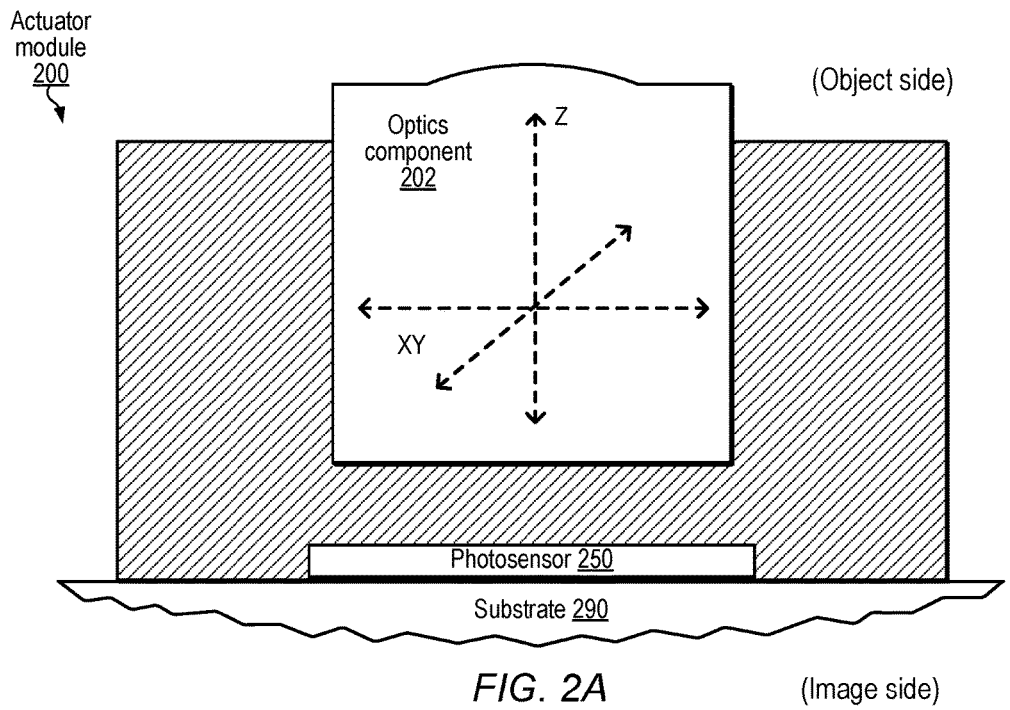
FIG. 2A and FIG. 2B collectively illustrate aspects of an example actuator module that provides mechanical autofocus (AF) and/or optical image stabilization (OIS) functionality for a camera of an electronic device, according to at least some embodiments.
Figure 2B:
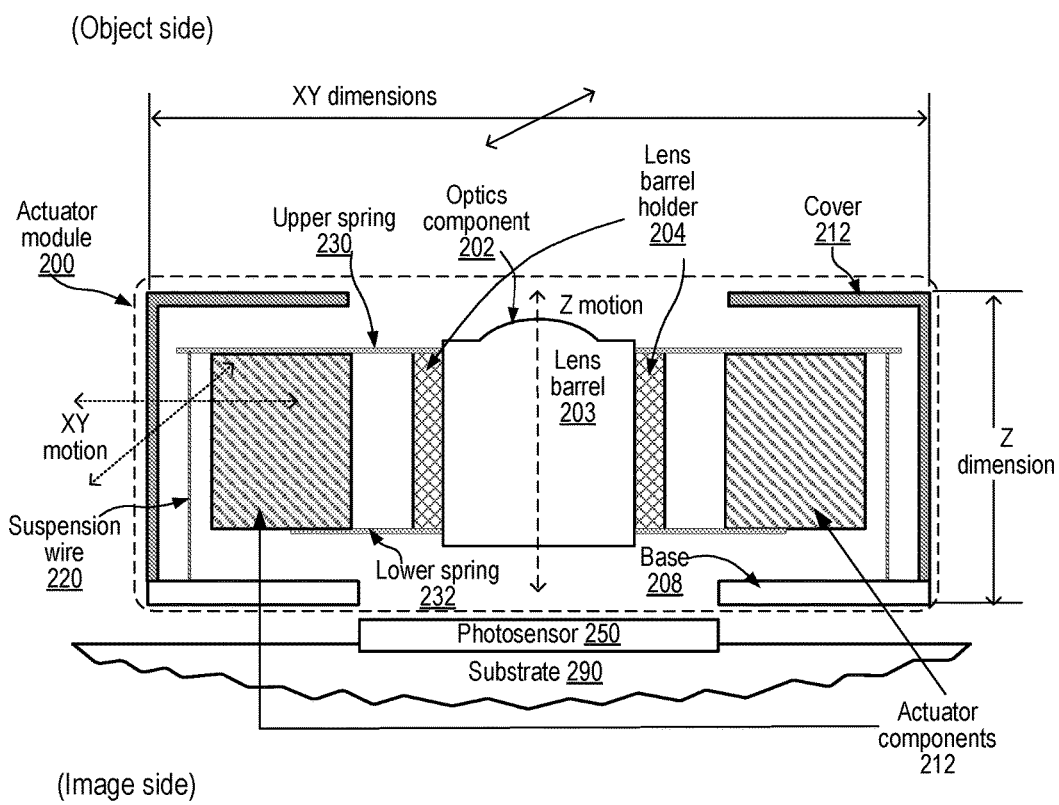

FIG. 2A and FIG. 2B collectively illustrate aspects of an example actuator module that may provide mechanical autofocus (AF) and/or optical image stabilization (OIS) functionality for a camera of an electronic device, according to at least some embodiments. The actuator module may, for example, form part of a camera module such as module 140 shown in FIG. 1. FIG. 2A provides a simplified view of the actuator module, with the object whose image is to be captured assumed to be positioned towards the top of FIG. 2A (as indicated by the label "Object side") and the image being captured at the photosensor 250, located towards the bottom of FIG. 2A (labeled "Image side"). FIG. 2B provides a cross-sectional view of the actuator with additional detail regarding actuator subcomponents.

In various embodiments, to achieve AF and/or OIS functionality in small form factor cameras, mechanical solutions, such as VCM (voice coil motor) technology that moves the an optics component (e.g., comprising a lens) in relation to the image plane in the Z (optical axis) direction for AF and in the X and Y (perpendicular to the Z axis) plane for OIS, may be used. The actuator module 200 shown in the embodiment of FIG. 2A and FIG. 2B may, for example, include a VCM driver. The actuator module 200 may, for example, be mounted to a substrate 290 that includes a photosensor 250 of the camera. The actuator module 200 may provide motion to optics component 202 on the Z (optical) axis and/or in the XY plane, based for example on the control signals received from one or more disturbance rejection controllers such as those shown in FIG. 1. The XY plane motion may, for example, provide optical image stabilization (OIS) by moving the optics component 202 on the X and/or Y axis relative to the photosensor 250. The Z axis motion may, for example, provide optical focusing or autofocus for the camera by moving the optics component 202 on the Z axis relative to the photosensor 250.

As shown in FIG. 2B, the optics component 202 may be coupled to one or more actuator components 204 by upper and/or lower springs 230 and 232. Actuator components 204 may include at least a subset of the circuitry which responds to control signals transmitted from one or more disturbance rejection controllers of the kind discussed in the context of FIG. 1. In some embodiments, the actuator circuitry may include elements which are not visible in the views provided in FIG. 2A and FIG. 2B. The optics component 202 may include a lens barrel 203 that includes a stack of lens elements and a lens barrel holder 204. The object side of the optics component 202 may be oriented to the top or upper side or surface of the actuator module 200, while the image side of the optics component 202 may be oriented the bottom or lower side or surface of the actuator module 200. The actuator component 204 may, for example, include magnets used in a VCM mechanism. The springs 230 and 232 may be flexible to allow motion of the optics component 202 on the Z axis relative to the actuator component 204 and photosensor 250. The actuator component 204 may be configured to move the optics component 202 and thus the lens barrel 203 on the Z axis within the actuator module 200 and relative to the photosensor 250 to provide focusing or autofocus for the camera.

An assembly which includes at least the optics component 202, actuator component 204, and springs 230 and 232 may be suspended within the actuator module 200 on two or more suspension wires 220 in various embodiments. For example, the suspension wires 220 may be mounted to base 208, and the assembly may be suspended on the wires 220 at the outer portion of the upper springs 230. The suspension wires 220 may be flexible to allow motion of the assembly, and thus of the optics component 202, on the XY axes orthogonal to the Z (optical) axis of the optics component 202. The actuator component 204 may be configured to move the optics component 202 and thus the lens barrel 203 on the XY axes within the actuator module 200 and relative to the photosensor 250 to provide optical image stabilization (OIS) for the camera. A cover 212 for the assembly may be attached to the base 208 of the actuator module 200 in the depicted embodiment. The assembled actuator module 200 may, for example, be mounted to a substrate 290 that includes a photosensor 250 of the camera. It is noted that at least in some embodiments, a plurality of distinct actuators may be used—e.g., one actuator may be used for moving the optics element for optical image stabilization, while another may be used for autofocus and/or zoom.

Figure 3:
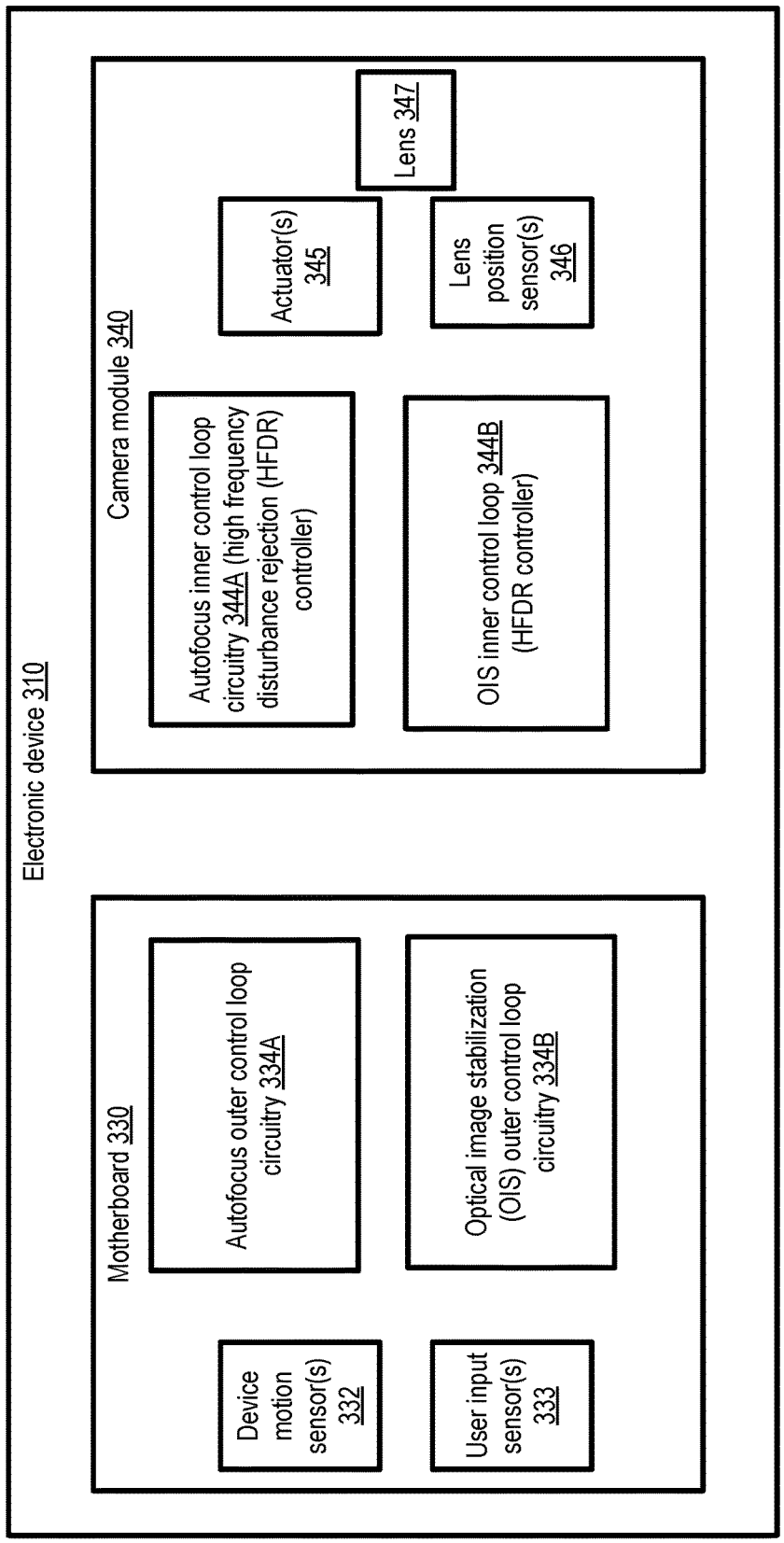
FIG. 3 illustrates an example of a camera-equipped electronic device in which respective pairs of control loops may be used for autofocus and optical image stabilization, according to at least some embodiments.

In some embodiments, separate sets of control circuitry may be used to support autofocus and optical image stabilization. FIG. 3 illustrates an example of a camera-equipped electronic device in which respective pairs of control loops may be used for autofocus and optical image stabilization, according to at least some embodiments. As shown, motherboard 330 of the electronic device 310 may comprise autofocus outer loop control circuitry 334A and OIS outer control loop circuitry 334B, as well as one or more device motion sensor(s) 332 and one or more user input sensor(s) 333. Camera module 340 may comprise autofocus inner control loop circuitry 344A, OIS inner control loop circuitry 344B, one or more actuators 345, and one or more lens position sensors 346 associated with lens 347 in the depicted embodiment. As indicated earlier, the inner control loops may also be referred to as high frequency disturbance rejection (HFDR) controllers.

The inner loop circuitry 344A may receive a first set of control signals associated with autofocus-related adjustments of the lens position from outer loop circuitry 334A at a particular sampling frequency (e.g., f1). The first set of control signals may have been generated at the outer loop circuitry 334A based at least partly on inputs from device motion sensor(s) 332 and/or user input sensor(s) 333, as well as parameters of a control algorithm being used at inner loop circuitry 334A. Based on the first set of control signals, and lens position data obtained from sensors 346, a second set of autofocus-related control signals may be sent from the inner loop circuitry 344A to one or more actuators 345 responsible for displacing the lens towards or away from the photosensor of the camera (along the Z axis). The second set of control signals may be transmitted at a higher frequency f2 than the signals received from the inner control loop 334A in at least some embodiments.

Similarly, the inner loop circuitry 344B may receive a third set of control signals associated with OIS-related adjustments of the lens position from outer loop circuitry 334B at a particular sampling frequency f3 (which may in some cases be equal to f1). The third set of control signals may have been generated at the outer loop circuitry 334B based at least partly on inputs from device motion sensor(s) 332 and/or user input sensor(s) 333, as well as parameters of a control algorithm being used at inner loop circuitry 334B. Based on the third set of control signals, and lens position data obtained from sensors 346, a fourth set of OIS-related control signals may be sent from the inner loop circuitry 344B to one or more actuators 345 responsible for displacing the lens in the XY-plane, perpendicular to the axis along which autofocus-related displacements are initiated. The fourth set of control signals may be transmitted at a higher frequency f4 (which may in some cases be equal to f2) than the signals received from the inner control loop 334B in at least some embodiments. It is noted that the control algorithm and/or parameters/coefficients used may differ among the various control loops shown in FIG. 3 in some embodiments—for example, it may be the case that a different algorithm or a different combination of algorithm parameters is used for loop 334A than for loop 334B, or a different combination of algorithm parameters is used for loop 344A than for loop 344B. Similarly, the frequencies f1, f2, f3 and f4 may all differ from one another in at least some embodiments.

In at least one embodiment, a particular actuator may be responsible for displacing the lens along only the Z axis, and/or a particular lens position sensor may be responsible for detecting changes in lens positioning only along the Z-axis. That is, in addition to the control loops, the actuator and lens position sensing functions may be segregated by function, with one {outer controller, inner controller, actuator set, lens position sensor set} combination being used for autofocus and a second {outer controller, inner controller, actuator set, lens position sensor set} being used for OIS. In some embodiments, different device motion sensors and/or user input sensors may be employed for managing autofocus than are used for managing OIS.

FIG. 4A-FIG. 4D collectively illustrate a plurality of approaches for co-locating high frequency disturbance rejection (HFDR) controllers with other circuitry of a camera module, according to at least some embodiments. Generally speaking, co-locating the HFDR controller with either the actuator circuitry and/or the lens position sensor circuitry on the same integrated circuit or ASIC may help reduce communication-related overhead (e.g., because the control signals generated at the HFDR controller may not need to be transmitted across ASIC boundaries or an interconnect to the actuator, and because the data generated at the lens position sensor may not have to be transmitted across an interconnect or ASIC boundary to the HFDR controller). Of course, given constraints on ASIC size and complexity, it may not always be possible to accommodate all three of the components on the same ASIC.

Figure 4A:
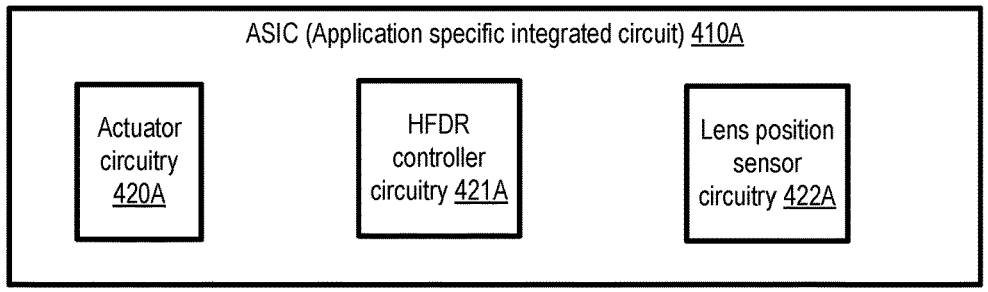
FIG. 4A-FIG. 4D collectively illustrate a plurality of approaches for co-locating high frequency disturbance rejection (HFDR) controllers with other circuitry of a camera module, according to at least some embodiments.
Figure 4B:
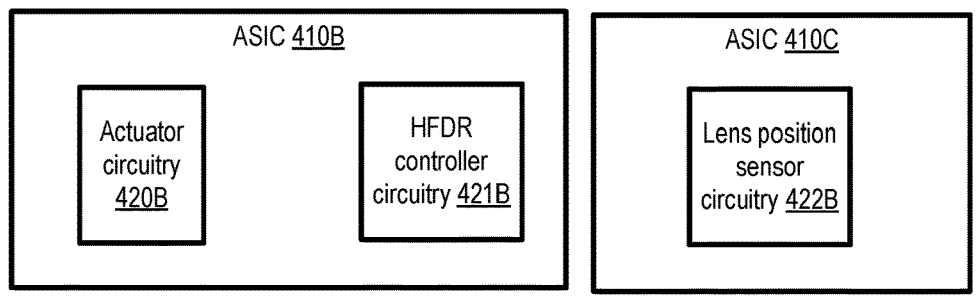
Figure 4C:
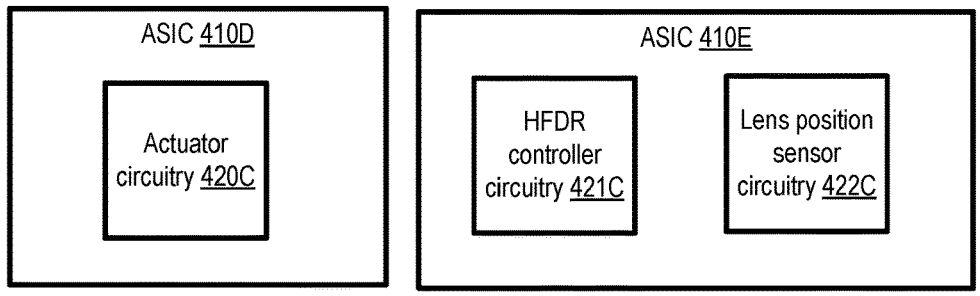
Figure 4D:
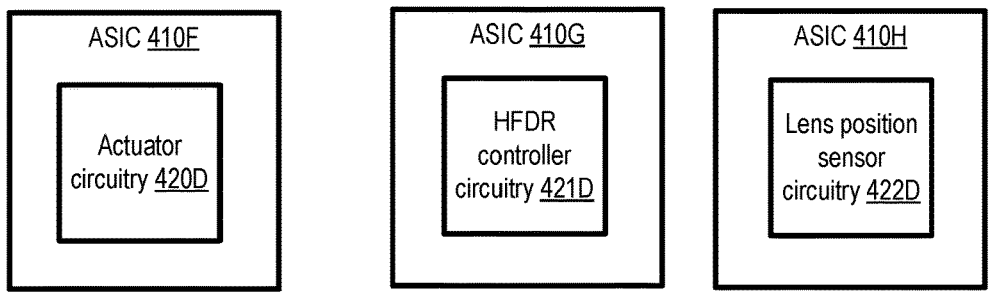

In the embodiment depicted in FIG. 4A, the HFDR controller circuitry 421A, the actuator circuitry 420A, and the lens position sensor circuitry 422A may all be incorporated within a single ASIC 410A. In the embodiment shown in FIG. 4B, the actuator circuitry 420B and the HFDR controller circuitry 421B may be incorporated within one ASIC 410B, while the lens position sensor circuitry 422B may be implemented at a different ASIC 410C. In the embodiment shown in FIG. 4C, the HFDR controller circuitry 421C is co-located with the lens position sensor circuitry 422C on ASIC 410E, while a different ASIC 410D is used for actuator circuitry 420C. In the embodiment depicted in FIG. 4D, three ASICs are used: ASIC 410F for actuator circuitry 420D, ASIC 410G for HFDR controller circuitry 421D, and ASIC 410H for lens position sensor circuitry 422D. As mentioned earlier, in some embodiments, respective HFDR controllers, actuators, and/or lens position sensors may be for autofocus and OIS functionality in some embodiments, which may increase the number of ASICs which could be used to six (instead of the maximum of three ASICs shown in FIG. 4D).

Figure 5A:
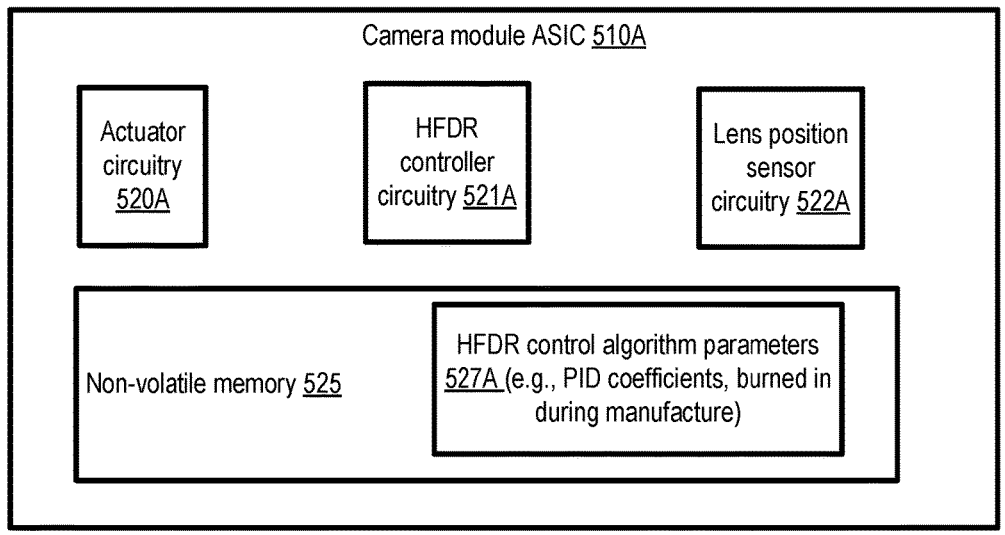
FIG. 5A and FIG. 5B illustrate respective techniques for specifying parameters to be used at a high frequency disturbance rejection controller, according to at least one embodiment.
Figure 5B:
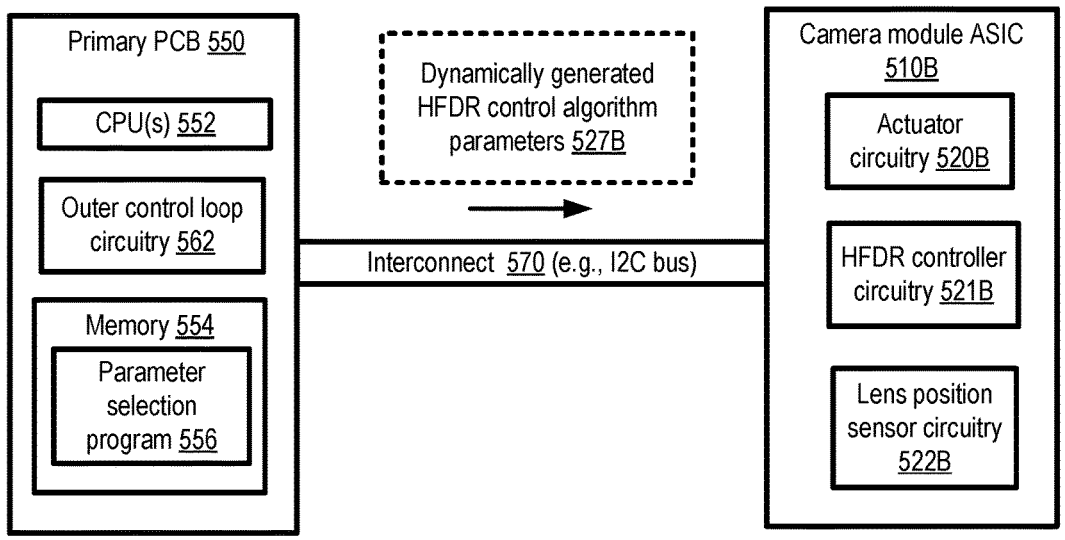

FIG. 5A and FIG. 5B illustrate respective techniques for specifying parameters to be used at a high frequency disturbance rejection controller, according to at least one embodiment. As mentioned earlier, any of a variety of control algorithms may be employed for either of the control loops used for disturbance rejection at an electronic device, including for example the PID controller algorithm or the LQI controller algorithm. Each controller algorithm type may have associated parameters which are used (together with the input data obtained from one or more sensors) to generate the controller output signals—e.g., respective coefficients Kp, Ki, and Kd which are associated with proportional, derivative and integral terms of the PID controller.

In the embodiment depicted in FIG. 5A, a camera module ASIC 510A may comprise a non-volatile memory 525 in addition to actuator circuitry 520A, HFDR controller circuitry 521A and lens position sensor circuitry 522A. One or more HFDR control algorithm parameters 527A may be indicated in the non-volatile memory 525 in the depicted embodiment. For example, in one implementation the parameter values may be "burned-in" during the manufacture of the ASIC 510A. Because the parameter values are burned in to non-volatile or read-only memory, it may not be feasible to change parameter values dynamically in embodiments similar to that shown in FIG. 5A.

In contrast, in the embodiment depicted in FIG. 5B, the parameter values may be generated dynamically using parameter selection program 556, whose executable version may be stored in memory 554 of the primary PCB 550 of the electronic device. The primary PCB may also include one or more processors or CPUs 552, as well as the outer control loop circuitry 562 uses in conjunction with HFDR controller circuitry 521B to respond to mechanical disturbances of the camera lens. CPUs 552 of the electronic device may execute the program 556, and transmit the dynamically generated control algorithm parameters 527B via interconnect 570 to the camera module ASIC 510B. CPUs 552 may also be referred to as "host processors" or "primary processors". The interconnect 570 (which may, for example, comply with an I2C bus specification in some implementations) may be used for transmitting the parameter values as well as the control signals from the outer loop to the camera module, and for transmitting lens position sensor data in the reverse direction from the camera module to the outer loop in the depicted embodiment. The dynamic approach towards parameter values selection shown in FIG. 5B may have the advantage of greater flexibility relative to the more static approach shown in FIG. 5A, and may enable the same integrated circuits to be used within different camera module mechanical designs (which may have different resonance modes with respect to disturbances). However, tradeoffs between the increased flexibility of the dynamic technique and the corresponding design complexity and communication overhead may have to be evaluated when selecting the manner in which the parameters are specified. Calibration parameters (e.g., associated with image color correction and/or distortion correction) may also be passed dynamically to the camera module via interconnect 570 in various embodiments.

Figure 6:
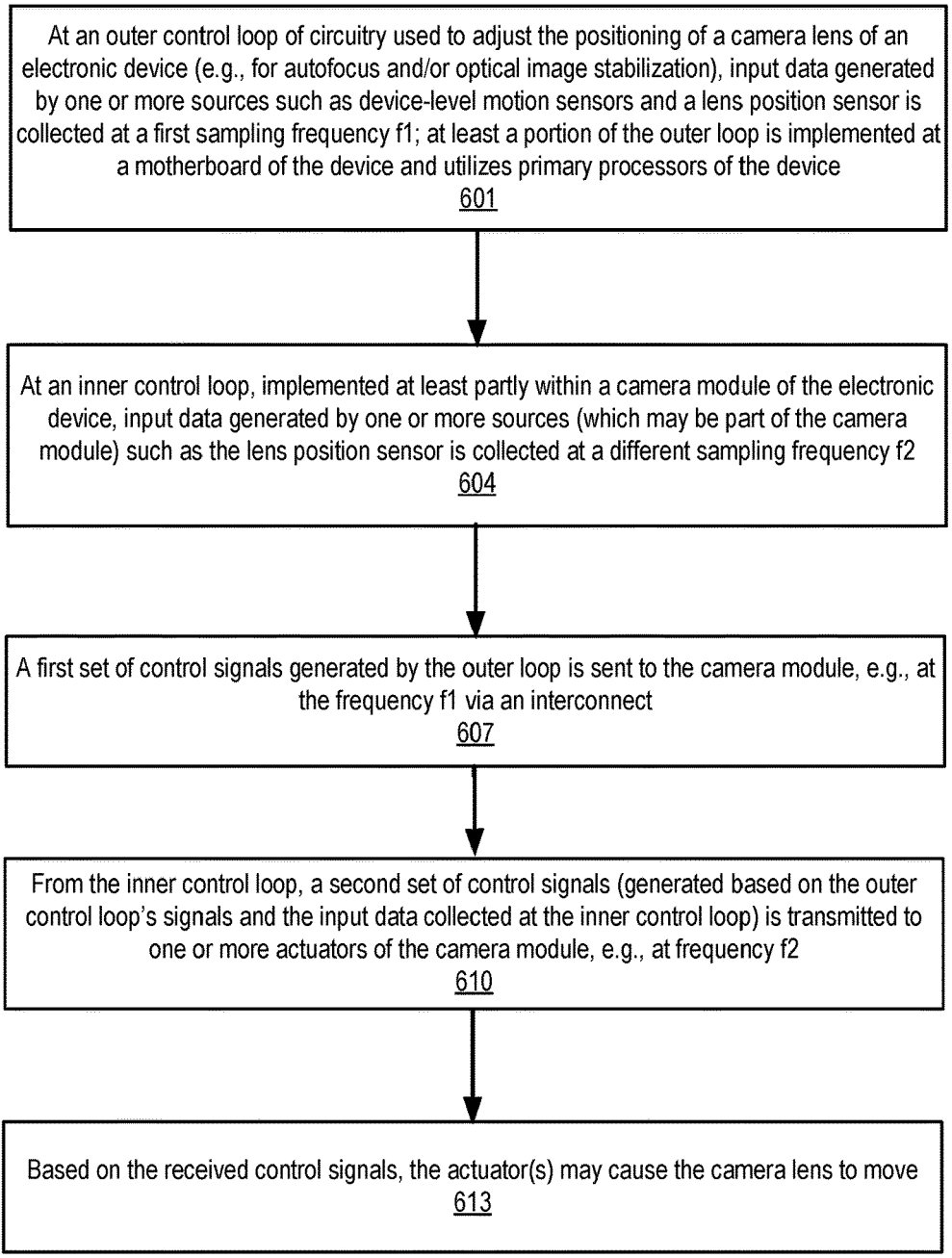
FIG. 6 is a flow diagram illustrating aspects of operations that may be performed to control lens movements at a camera-equipped electronic device which includes a high frequency disturbance rejection controller, according to at least some embodiments.

FIG. 6 is a flow diagram illustrating aspects of operations that may be performed to control lens movements at a camera-equipped electronic device which includes a high frequency disturbance rejection controller, according to at least some embodiments. As shown in element 601, input data for an outer control loop used to adjust the positioning of a camera lens of an electronic device (e.g., for autofocus, optical image stabilization, zoon, etc.) may be obtained at a first sampling frequency f1 from one or more data sources such as device motion sensors and lens position sensors. At least a portion of the outer control loop may be implemented using one or more primary processors or CPUs of the electronic device, e.g., at a motherboard or other primary PCB of the device. It is noted that although the input data may be sampled or obtained at frequency f1, the rate at which the data sources generate the data may differ from f1. The lens position sensor may be incorporated within the camera module in at least some embodiments, and the data generated by it may be obtained at the one or more primary processors via an interconnect (such as an I2C interconnect) linking the camera module to the motherboard.

As shown in element 604, a second set of data may be obtained from one or more sources including the lens position sensor at an inner control loop at a different sampling frequency f2. The inner control loop may be implemented at least in part at a camera module of the electronic device in the depicted embodiment. In embodiments in which the lens position sensor (or at least a portion of circuitry associated with the lens position sensor) is incorporated within the camera module, obtaining data from the lens position sensor at the inner control loop may not require the use of the interconnect between the camera module and the motherboard. The sampling frequency f2 may be higher than sampling frequency f1 in at least some embodiments, and the inner control loop may therefore be designated as a high frequency disturbance rejection (HFDR) controller in such embodiments.

Based at least in part of the data obtained from the various sensors at the outer control loop, and based at least in part on the particular control algorithm and parameters being used at the outer control loop, a first set of control signals may be generated at the outer control loop and transmitted to the camera module (e.g., over the interconnect which was used to obtain the lens position data at the outer control loop) at the frequency f1 in the depicted embodiment (element 607).

At the inner control loop, a second set of control signals may be generated, e.g., based at least in part on the first set of control signals, the input data collected from sensors at the inner control loop, and/or on the particular control algorithm and parameters employed at the inner control loop. This second set of control signals may be transmitted from the inner control loop to one or more actuators at the camera module (element 610), e.g., at frequency f2. In response to the second set of control signals, the one or more actuators may cause a displacement of a camera lens of the electronic device (element 613) in the depicted embodiment. Changes in the position of the lens (caused either by the control signals, or by external disturbance sources such as vibration, tapping, haptic feedback events etc.) may be captured by the lens position sensor, and corresponding data may be fed back to one or both of the control loops, potentially leading to additional adjustments based on the generation of additional control signals.

Figure 7:
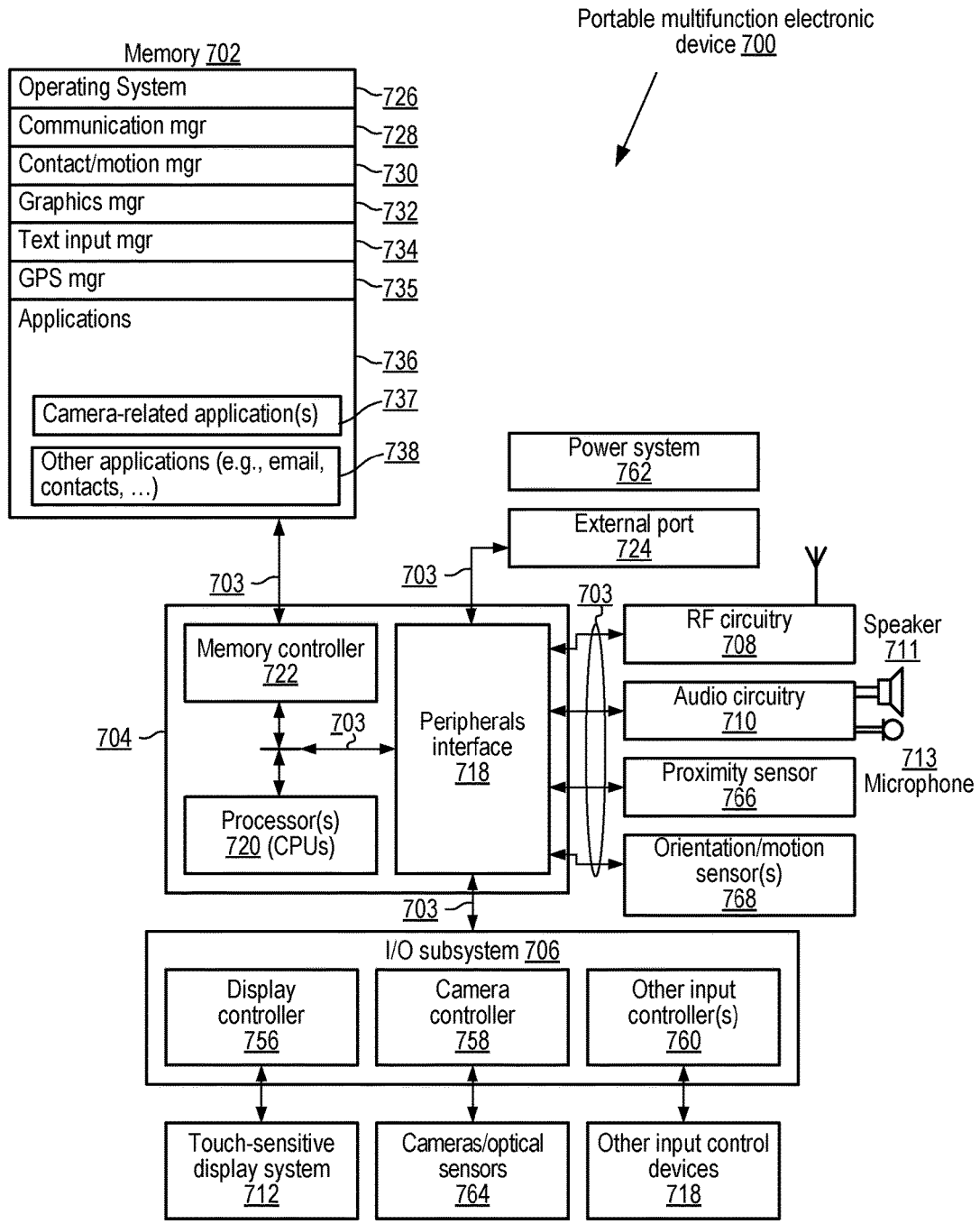
FIG. 7 illustrates example subcomponents of a portable multifunction electronic device at which a high frequency disturbance rejection controller may be used, according to at least one embodiment.

FIG. 7 illustrates example subcomponents of a portable multifunction electronic device at which a high frequency disturbance rejection controller may be used, according to at least one embodiment. The device 700 may include one or more cameras 764, which may also be referred to as optical sensors. At least a portion of an inner control loop of the kind referred to above, which may be utilized to respond to high frequency disturbances, may be implemented at a camera controller 758 in the depicted embodiment, while at least a portion of a corresponding outer control loop may be implemented using primary processor(s) 720. Camera actuators and/or lens position sensors and associated circuitry are not shown in FIG. 7, but may be implemented at least in part at camera controller 758 and/or at the cameras 764.

As shown, device 700 may include memory 702 (which may include one or more computer readable storage media), memory controller 722, one or more processing units (CPU's) 720, peripherals interface 718, RF circuitry 708, audio circuitry 710, speaker 711, touch-sensitive display system 712, microphone 113, proximity sensor 766, orientation/motion sensors 768, input/output (I/O) subsystem 706, other input or control devices 716, and external port 724. These components may communicate over one or more communication buses or signal lines 703.

RF (radio frequency) circuitry 708 may receive and send RF signals, also called electromagnetic signals. RF circuitry 708 may convert electrical signals to/from electromagnetic signals and communicate with telecommunications networks and other communications devices via the electromagnetic signals. RF circuitry 708 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 708 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols or technologies.

It should be appreciated that device 700 is only one example of a portable multifunction device, and that device 700 may have more or fewer components than shown, may combine two or more components, or may have a different configuration or arrangement of the components. The various components shown may be implemented in hardware, software, or a combination of hardware and software, including one or more signal processing and/or application specific integrated circuits.

Memory 702 may include high-speed random access memory and may also include non-volatile memory, such as one or more magnetic disk storage devices, flash memory devices, or other non-volatile solid-state memory devices. Access to memory 702 by other components of device 700, such as CPU 720 and the peripherals interface 718, may be controlled by memory controller 722. Peripherals interface 718 may be used to couple input and output peripherals of the device to CPUs 720 and memory 702. The one or more processors 720 may run or execute various software programs and/or sets of instructions stored in memory 702 to perform various functions for device 700 and to process data. In some embodiments, peripherals interface 718, CPUs 720, and memory controller 722 may be implemented on a single chip, such as chip 704. In some other embodiments, they may be implemented on separate chips.

I/O subsystem 706 may couple input/output peripherals such as touch screen 712, cameras 764, and other input control devices 716, to peripherals interface 718. In addition to camera controller 758, I/O subsystem 706 may include display controller 756 and one or more input controllers 760 for other input or control devices. In addition to various other functions, the touch screen 712 may be used in some embodiments to indicate target objects for autofocus—as such, input received via the touch screen may be provided to the outer control loop used for lens positioning. Touch screen 712 may use LCD (liquid crystal display) technology, LPD (light emitting polymer display) technology, or LED (light emitting diode) technology, although other display technologies may be used in other embodiments. Touch screen 712 and display controller 756 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 712. In an example embodiment, projected mutual capacitance sensing technology may be used.

Device 700 also includes power system 762 for powering the various components. Power system 762 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The cameras 764 may include charge-coupled device (CCD) or complementary metal-oxide semiconductor (CMOS) phototransistors in various embodiments, and may be used to capture still images and/or video. In some embodiments, the photosensor of a camera may be located on the back of device 700, opposite touch screen display 712 on the front of the device, so that the touch screen display may be used as a viewfinder for still and/or video image acquisition. In some embodiments, another optical sensor or camera may be located on the front of the device. In embodiments in which multiple cameras 764 are supported, each of the multiple cameras may include its own photo sensor(s), or the multiple cameras may be supported by a shared photosensor. In some embodiments in which multiple cameras 764 are supported, each of the multiple cameras 764 may include its own set of disturbance controllers (comprising nested control loops of the kind described above) and image processing pipeline. In other embodiments, a single set of disturbance controllers and a single image processing pipeline may be used for multiple cameras 764.

Device 700 may include one or more orientation/motion sensors 768 such as accelerometers (e.g., one or more linear accelerometers and/or one or more rotational accelerometers), gyroscopes, magnetometers and the like. In some embodiments, the one or more orientation sensors include one or more magnetometers. In some embodiments, the one or more orientation/motion sensors may include one or more of global positioning system (GPS), Global Navigation Satellite System (GLONASS), and/or other global navigation system receivers. Although FIG. 7 shows the orientation/motion sensors 768 coupled to peripherals interface 718, the sensors 768 may be coupled to an input controller 760 in I/O subsystem 706 in some embodiments. As mentioned earlier, input from one or more of the motion sensors may be utilized at the outer control loop used for camera lens position adjustments in at least some embodiments.

In the depicted embodiment, the software components stored in memory 702 may include operating system 726, communication manager 728 (responsible for communicating with other electronic devices), contact/motion manager 730 (responsible for touch-related functions), graphics manager 732 (responsible for rendering graphics), text input manager 734, Global Positioning System (GPS) manager 735, and a set of applications 736. A wide variety of applications may be run at device 700, including for example one or more camera-related applications 737, e-mail clients, contacts, web browsers, music players, video players, games, and other applications 738. The operating system 726 may include various software components and/or drivers for controlling and managing general system tasks (e.g., memory management, storage device control, power management, etc.) and facilitate communication between various hardware and software components. Each of the components (e.g., communication manager 728, contact/motion manager 730, etc.) and applications may correspond to a set of executable instructions for performing one or more functions. These components (i.e., sets of instructions) need not be implemented as separate software programs, procedures or modules, and thus various subsets of these modules may be combined or otherwise rearranged in various embodiments. In some embodiments, memory 702 may store a subset of the modules and data structures identified above. Furthermore, memory 702 may store additional modules and data structures not described above.

Figure 8:
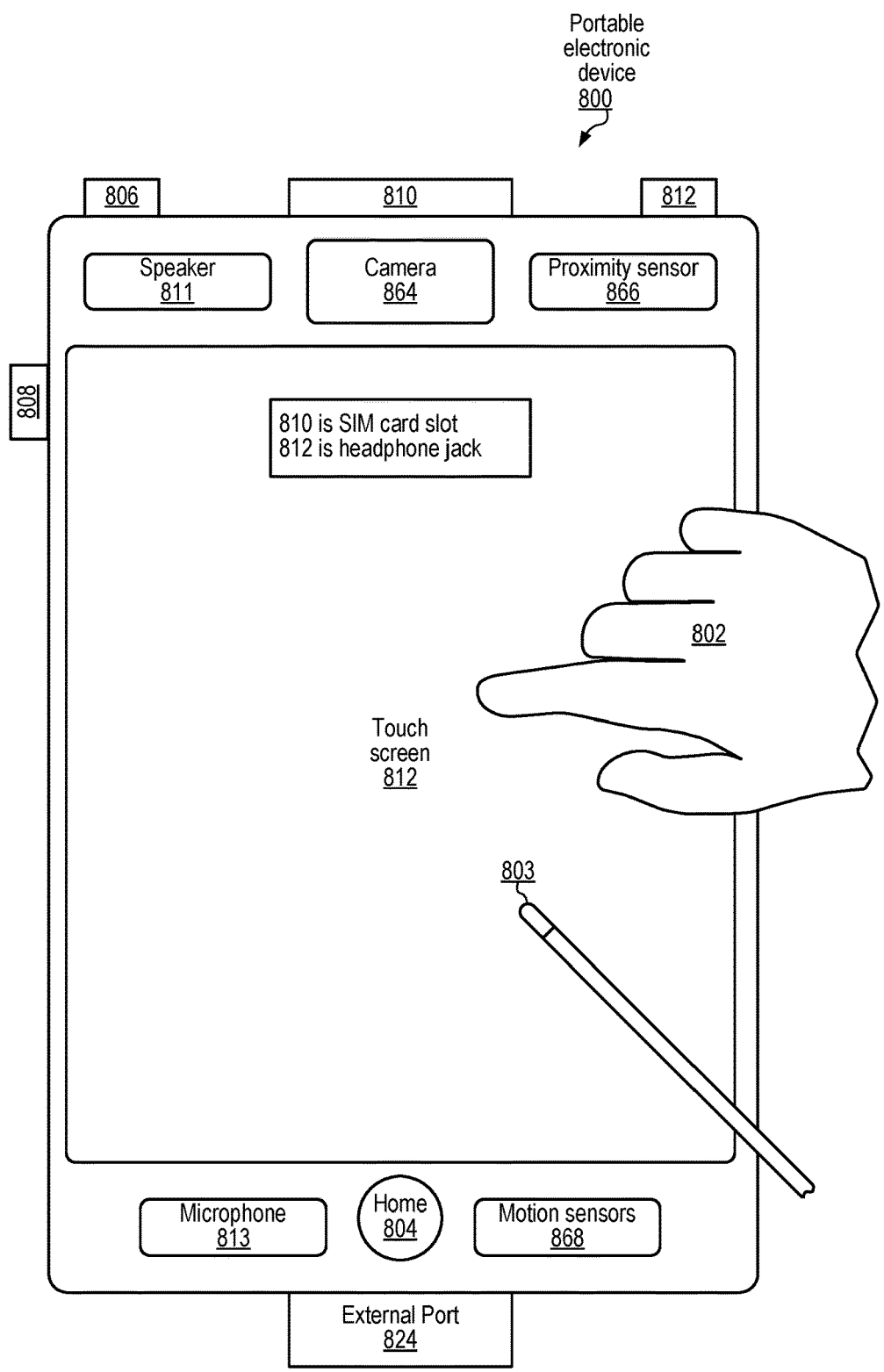
FIG. 8 illustrates a front view of an example camera-equipped electronic device at which high frequency disturbance rejection controllers may be used for one or more camera lenses, according to at least one embodiment.

FIG. 8 illustrates a front view of an example camera-equipped electronic device at which high frequency disturbance rejection controllers may be used for one or more camera lenses, according to at least one embodiment. As shown, portable electronic device 800 includes a camera 864 and a touch screen 812. In the depicted embodiment, a user may select one or more of the graphics elements displayed on the touch screen 801 by making a gesture on the graphics, for example, with one or more fingers 802 (not drawn to scale in the figure) or one or more styluses 803 (not drawn to scale in the figure).

Device 800 may also include one or more physical buttons, such as "home" or menu button 804 and/or push buttons 806 and 808. Menu button 804 may be used to navigate to various applications of a set of applications that may be executed on device 800. Alternatively, in some embodiments, the menu button may be implemented as a soft key in displayed on touch screen 812. Device 800 may also include a Subscriber Identity Module (SIM) card slot 810, head set jack 812, and docking/charging external port 824. Push buttons 806 and/or 808 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments a push button 808 may be used to control the volume of audio produced by device 800. In one embodiment, device 800 also may accept verbal input for activation or deactivation of some functions through microphone 813, including for example an instruction to take a photograph or video using a camera 864. The camera 864 may have an associated nested set of control loop circuitry of the kind described above. Motion sensor(s) 868 may provide a portion of the input used for the disturbance controllers as discussed earlier. In at least some embodiments, device 800 may also include one or more rear-facing cameras in addition to the front-facing camera 864 shown in FIG. 8. Each of the cameras may have a respective set of disturbance controllers in some embodiments.

Figure 9:
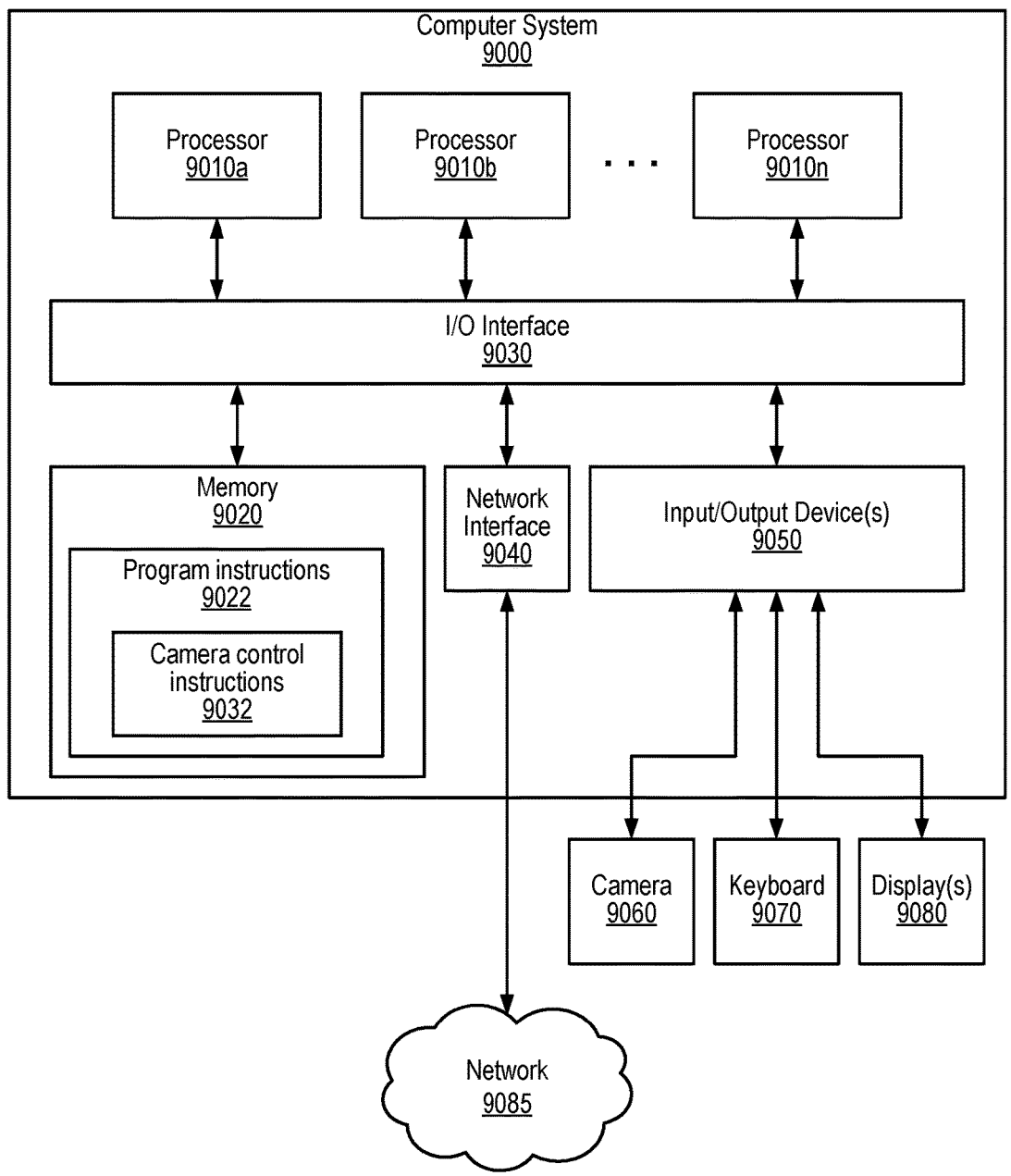
FIG. 9 illustrates an example computer system configured to implement one or more techniques for camera lens disturbance control, according to some embodiments.

FIG. 9 illustrates an example computer system configurable to implement one or more techniques for camera lens disturbance control, according to some embodiments. In different embodiments, computer system 9000 may be any of various types of devices, including, but not limited to, a personal computer system, desktop computer, laptop, notebook, tablet, pad, or netbook computer, a set top box, a mobile device, a video game console, handheld video game device, a digital camera, or in general any type of computing or electronic device. In various embodiments, the computer system 9000 may include one or more cameras and associated circuitry at which at least a portion of the functionality of the outer control loop and/or the inner control loop, discussed above in the context of FIG. 1-FIG. 8, may be implemented.

In the illustrated embodiment, computer system 9000 includes one or more processors 9010 coupled to a system memory 9020 via an input/output (I/O) interface 9030. Computer system 1500 further includes a network interface 9040 coupled to I/O interface 9030, and one or more input/output devices 9050, such as one or more cameras 9060, keyboard 9070, and display(s) 9080. In some cases, it is contemplated that embodiments may be implemented using a single instance of computer system 9000, while in other embodiments multiple such systems, or multiple nodes making up computer system 9000, may be configured to host different portions or instances of embodiments. For example, in one embodiment some elements may be implemented via one or more nodes of computer system 9000 that are distinct from those nodes implementing other elements.

In various embodiments, computer system 9000 may be a uniprocessor system including one processor 9010, or a multiprocessor system including several processors 9010 (e.g., two, four, eight, or another suitable number). Processors 9010 may be any suitable processor capable of executing instructions. For example, in various embodiments processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA.

System memory 9020 may be configured to store camera control instructions 9022 and/or camera control data accessible by processors 9010. In various embodiments, system memory 9020 may be implemented using any suitable memory technology, such as static random access memory (SRAM), synchronous dynamic RAM (SDRAM), nonvolatile/Flash-type memory, or any other type of memory. In the illustrated embodiment, program instructions 9022 may be configured to implement at least a portion of the disturbance controller functionality described above. In some embodiments, program instructions and/or data may be received, sent or stored upon different types of computer-accessible media or on similar media separate from system memory 9020 or computer system 9000.

In one embodiment, I/O interface 9030 may be configured to coordinate I/O traffic between processors 9010, system memory 9020, and any peripheral devices in the device, including network interface 9040 or other peripheral interfaces, such as input/output devices 9050. In some embodiments, I/O interface 9030 may perform any necessary protocol, timing or other data transformations to convert data signals from one component (e.g., system memory 9020) into a format suitable for use by another component (e.g., processors 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computer system 9000 and other devices attached to a network 9085 (e.g., carrier or agent devices) or between nodes of computer system 9000. Network 9085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 9040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices of computer system 9000 may, in some embodiments, include one or more display terminals, keyboards, keypads, touchpads, scanning devices, voice or optical recognition devices, or any other devices suitable for entering or accessing data. Multiple input/output devices 9050 may be present in computer system 9000 or may be distributed on various nodes of computer system 9000. In one embodiments, at least some input/output devices (including, for example, one or more cameras) may be separate from computer system 9000 and may interact with one or more nodes of computer system 9000 through a wired or wireless connection, such as over network interface 9040.

As shown in FIG. 9, memory 9020 may include program instructions 9022, which may be processor-executable to implement any element or action described above. In one embodiment, the program instructions may implement the methods described above. In other embodiments, different elements and data may be included. Note that data may include any data or information described above.

Those skilled in the art will appreciate that computer system 9000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 9000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 9000 may be transmitted to computer system 9000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The techniques and methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

What is claimed is:

1. An electronic device, comprising:
one or more processors, and
a camera module, wherein the camera module comprises one or more actuators, one or more lens position sensors and one or more disturbance rejection controllers;
wherein the one or more processors are configured to:
based at least in part on one or more of (a) a first set of data obtained from a particular lens position sensor of the one or more lens position sensors, wherein the first set of data is obtained by the one or more processors at a first sampling frequency, or (b) a second set of data generated by one or more motion sensors associated with the electronic device, transmit a first set of control signals to the camera module via a particular interconnect;
wherein a particular disturbance rejection controller of the one or more disturbance rejection controllers is configured to:

based at least in part on (a) another set of data obtained from the particular lens position sensor, wherein the other set of data is obtained by the particular disturbance rejection controller at a second sampling frequency without utilizing the particular interconnect, wherein the second sampling frequency is higher than the first sampling frequency, and (b) the first set of control signals, transmit a second set of control signals to a particular actuator of the one or more actuators; and
wherein the particular actuator is configured to:
cause, based at least in part on the second set of control signals, a camera lens to move.

2. The electronic device as recited in claim 1, wherein the particular actuator comprises optical image stabilization circuitry, and wherein the camera lens is caused to move along one or more axes to stabilize an image.

3. The electronic device as recited in claim 1, wherein the particular actuator comprises autofocus circuitry, and wherein the camera lens is caused to move along one or more axes to adjust a distance between the camera lens and a photosensor.

4. The electronic device as recited in claim 1, wherein the particular actuator comprises a voice coil motor driver implemented on a particular integrated circuit, and wherein the particular integrated circuit comprises the particular disturbance rejection controller.

5. The electronic device as recited in claim 1, wherein the particular lens position sensor is implemented at least in part on a particular integrated circuit, and wherein the particular integrated circuit comprises the particular disturbance rejection controller.

6. The electronic device as recited in claim 1, wherein the camera module is configured to:
cause an indication of a change in the position of the camera lens, wherein the change is detected by the one or more lens position sensors, to be stored in a register; and
wherein the one or more processors are configured to:
read the register to obtain the first set of data.

7. The electronic device as recited in claim 1, wherein the particular disturbance rejection controller is configured to:
obtain respective values of one or more control algorithm parameters; and
generate the second set of control signals based at least in part on the one or more control algorithm parameters.

8. The electronic device as recited in claim 7, wherein the one or more processors are configured to:
determine the respective values of the one or more control algorithm parameters; and
transmit, to the camera module via the interconnect, the respective values of the one or more control algorithm parameters.

9. The electronic device as recited in claim 7, wherein the camera module comprises a non-volatile memory, and wherein the particular disturbance rejection controller is configured to read the respective values of the one or more control algorithm parameters from the non-volatile memory.

10. The electronic device as recited in claim 7, wherein the one or more algorithm parameters comprise one or more of: (a) a coefficient associated with a proportional-integral-derivative (PID) control algorithm, or (b) a coefficient associated with a linear-quadratic-integral (LQI) algorithm.

11. A camera module of an electronic device, comprising:
one or more actuators including a first actuator,
one or more lens position sensors including a first lens position sensor, and one or more disturbance rejection controllers including a first disturbance rejection controller;

wherein the first disturbance rejection controller is configured to:

obtain a first set of control signals generated at one or more processors external to the camera module, wherein the first set of control signals is based at least in part on one or more of: (a) a first set of data generated at the first lens position sensor, or (b) a second set of data generated by one or more sensors external to the camera module;

obtain a third set of data generated at the first lens position sensor;

transmit a second set of control signals to the first actuator, wherein the second set of control signals is based at least in part on (a) the first set of control signals and (b) the third set of data; and wherein, in response to the second set of control signals, the first actuator is configured to cause a displacement of a camera lens of the electronic device.

12. The camera module as recited in claim 11, wherein the first set of control signals is obtained at the camera module at a first sampling frequency via a particular interconnect from a printed circuit board comprising one or more CPUs (central processing units) of the electronic device, and wherein the second set of control signals is transmitted to the first actuator at a second sampling frequency.

13. The camera module as recited in claim 11, wherein the first actuator is an optical image stabilization actuator, wherein the one or more actuators comprise an autofocus actuator, wherein the one or more disturbance rejection controllers include a second disturbance rejection controller configured to transmit a third set of control signals to the autofocus actuator.

14. The camera module as recited in claim 11, wherein the first disturbance rejection controller is implemented at a first integrated circuit, and wherein at least a portion of circuitry of the first actuator is implemented at a second integrated circuit.

15. The camera module as recited in claim 11, wherein the first disturbance rejection controller is implemented at a first integrated circuit, and wherein at least a portion of circuitry of the first lens position sensor is implemented at a second integrated circuit.

16. A method, comprising:

obtaining, at one or more processors of an electronic device, one or more of (a) a first set of data generated by a particular sensor included within a camera module of the electronic device, or (b) a second set of data generated by one or more sensors external to the camera module;

transmitting, from the one or more processors to the camera module, a first set of control signals, wherein the first set of control signals is based at least in part on one or more of: (a) the first set of data or (b) the second set of data;

transmitting, from a particular disturbance rejection controller of the camera module to a particular actuator of the camera module, a second set of control signals, wherein the second set of control signals is based at least in part on (a) a third set of data obtained from the particular sensor included within the camera module and (b) the first set of control signals; and causing, by the particular actuator, based at least in part on the second set of control signals, a camera lens to move.

17. The method as recited in claim 16, wherein the first set of control signals is transmitted to the camera module at a first frequency via a particular interconnect, and wherein the second set of control signals is transmitted to the particular actuator at a second frequency.

18. The method as recited in claim 16, wherein the one or more sensors external to the camera module include one or more of: (a) a gyroscope, (b) an accelerometer or (c) a touch detector, and wherein the particular sensor included within the camera module comprises a lens position sensor.

19. The method as recited in claim 16, wherein the particular actuator comprises optical image stabilization circuitry, and wherein the camera lens is caused to move along one or more axes to stabilize an image.

20. The method as recited in claim 16, wherein the particular actuator comprises autofocus circuitry, and wherein the camera lens is caused to move along one or more axes to adjust a distance between the camera lens and a photosensor.

* * * * *